Patented Feb. 4, 1947

2,415,230

UNITED STATES PATENT OFFICE 2,415,230

PROCESS FOR MAKING THE METHYL ESTER OF M-DIMETHYLAMINOBENZOIC ACID

Clyde S. Adams, Yellow Springs, Ohio, assignor to The National Cash Register Company, Dayton, Ohio, a corporation of Maryland No Drawing. Application October 12, 1945, Serial No. 622,077

1 Claim. (Cl. 260—471)

This invention relates to an improved method for making the methyl ester of m-dimethylaminobenzoic acid having the structure

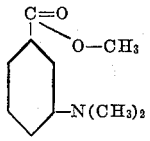

The improved method pertains to the conversion of the hydrated hydroiodic acid salt of m-trimethylbenzbetaîn to the final product. The hydrated hydroiodic acid salt of m-trimethylbenzbetaîn having the structure

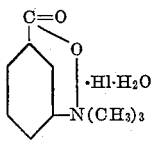

is not available commercially, so its manufacture from the commercially available substances m-aminobenzoic acid, methyl iodide, potassium hydroxide, and hydrochloric acid will be described, although it forms no part of the novel improved process.

The final product, m-dimethylaminobenzoic acid, is an amphoteric compound useful in the dye industry for introducing a m-dimethylaminobenzoic acid group into a compound in a selected specific position.

To prepare the hydrated hydroiodic acid salt of m-trimethylbenzbetaîn, m-aminobenzoic acid is first converted to m-trimethylbenzbetaîn in the following manner:

Seventy grams of m-aminobenzoic acid is dissolved in 700 milliliters of 50% methyl alcohol, using a two-liter flask fitted with a cork. The resulting mixture may be warmed to effect complete solution. To the solution, when cooled, is added 225 grams of methyl iodide, followed by the addition of 105 grams of 85% potassium hydroxide, which is the approximate strength of the ordinary chemically pure product, in three separate charges of 35 grams each, each 35-gram charge being previously dissolved in 100 cc. of 50% methyl alcohol. The first charge is introduced into the flask, which is stoppered and permitted to stand at room temperature until a test shows that the solution is acid. The second and third charges are added successively, the timing of the third charge, as in the case of the second charge, awaiting the acid condition of the solution. The solution is allowed to stand until the disappearance of the methyl iodide which forms a separate layer at the bottom of the flask. This period of methylation usually requires from three to five days. This period of methylation may be considerably shortened by increasing the temperature, by agitation, and by carrying out the experiment in an autoclave. The contents of the flask are now subjected to distillation until most of the methyl alcohol has been distilled over. The remaining aqueous solution is cooled, and 75 milliliters of concentrated hydrochloric acid (37% gas content by weight) is added. On standing and cooling, white crystals of the hydrated hydroiodic salt of m-trimethylbenzbetaîn separate out.

The novel process of converting m-trimethylbenzbetaîn to the methyl ester of m-dimethylaminobenzoic acid includes two distinct steps of heating.

The first heating period is carried on in a hot air oven or oil bath. The temperature is gradually raised to about 140 degrees centigrade, when the first evidence of decomposition appears, water vapor and gaseous hydrogen iodide being given off. The temperature is permitted to climb slowly to about 200 degrees centigrade, when all the solid has disappeared and a yellow oil is present. However, this yellow oil still contains a small amount of the undecomposed hydrated hydroiodic acid salt dissolved in it. The decomposition should be carried on slowly and carefully to prevent loss of product by entrainment. The resulting light oil, which is essentially the free betaîn, having the following structure

may be allowed to remain in the container at the end of the first heating period.

The second heating is at approximately 235 degrees centigrade and is for a period of approximately twenty minutes (the exact time being determined by removing a sample and checking its solubility in benzene. If completely soluble, the product has been heated long enough), during which any unchanged hydroiodic acid salt of m-trimethylbenzbetaîn is decomposed and the free betaîn is changed to the corresponding methyl ester, leaving the end product, the methyl ester of m-dimethylaminobenzoic acid, which on cooling forms a yellow waxlike solid.

The commercial advantages of this novel process are that it is safe, it is simple, it requires only the simplest apparatus, and the yield is nearly quantitative.

The process is not to be deemed exactly limited to the preferred ranges of temperature shown, as it is apparent that the invention comprises in general a decomposition step and a molecular rearrangement step, both accomplished by the use of heat.

What is claimed is:

The process of making the methyl ester of m-dimethylaminobenzoic acid comprising the step of heating the hydrated hydroiodic acid salt of m-trimethylbenzbetain to decompose most of it by driving off the hydrogen iodide and water as gases, and the step of heating the residue to approximately 235 degrees centrigrade until tests show that the m-trimethylbenzbetain has been converted to the methyl ester of m-dimethylaminobenzoic acid.

CLYDE S. ADAMS.

REFERENCES CITED

The following references are of record in the file of this patent:

Griess "Ber. der Deutschen Chemischen Gesellschaft," vol. 6 (1873), pages 585–8.

Willstotter "Ber. der Deutschen Chemischen Gesellschaft," vol. 35 (1902), pages 587, 595.